March 24, 1953  L. G. ERICKSON ET AL  2,632,871
REMOTE POSITION-CONTROL SYSTEM
Filed March 22, 1949  2 SHEETS—SHEET 1

MASTER OSCILLATOR A-FREQUENCY VS SHAFT POSITION

MASTER OSCILLATOR B-FREQUENCY VS SHAFT POSITION

INVENTORS,
LENNART G. ERICKSON.
KURT E. APPERT.
BY Lippincott & Smith
ATTORNEYS

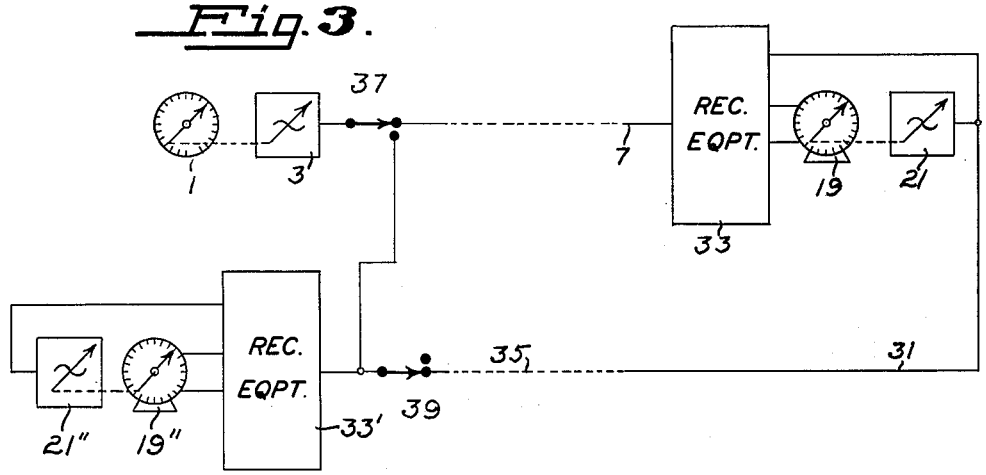
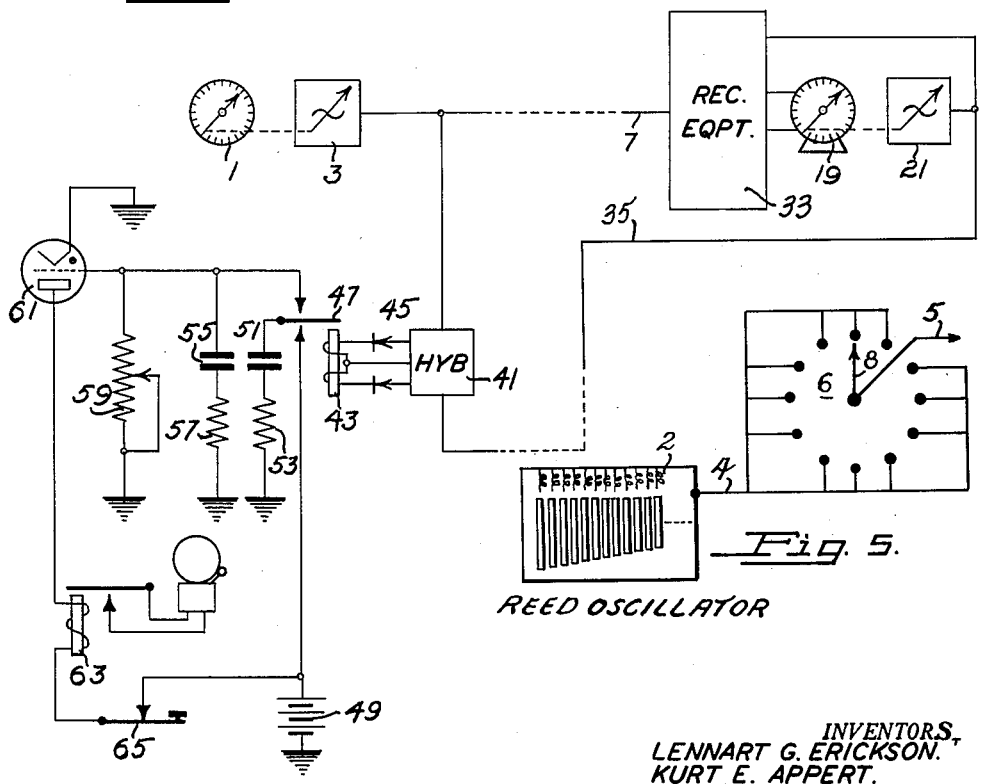

Patented Mar. 24, 1953

2,632,871

UNITED STATES PATENT OFFICE 2,632,871

REMOTE POSITION-CONTROL SYSTEM

Lennart G. Erickson and Kurt E. Appert, San Francisco, Calif., assignors to Lenkurt Electric Co., Inc., San Carlos, Calif., a corporation of Delaware Application March 22, 1949, Serial No. 82,724

10 Claims. (Cl. 318—28)

This invention relates to remote control or servo systems; that is, to systems whereby the position of some mechanical element over which control is desired can be regulated from a distant point with a very high degree of accuracy. One example of an element to be controlled is the tuning dial of a radio receiver, but the element under control is not so limited; it could be the altitude control of an airplane, the position of a gun turret, a compass repeater, or any one of a multitude of mechanical devices.

Among the objects of this invention are to provide a remote control system of a high degree of accuracy; to provide such a system which will operate to give accurate control over a wide range using only frequencies within the limits of a single voice channel of a telephone or radio circuit; to provide a control system which will give direct control of a rotating member continuously through any number of revolutions in a single direction, and which may, nonetheless, be reversed and will therefore follow accurately the movements of a controlling member in any desired sequence of operation; to provide a control system which will give accurate and positive response to within a fraction of a degree of arc; to provide a system which will repeat back to the control point, indicating that it has responded and showing any lapse of control or, either alternatively or in addition, indicate with the same degree of accuracy as the original control, the response to such control and the errors, if such errors should arise through failure of any part of the equipment.

Many types of remote controls and servomechanisms to actuate them have developed in recent years. Accuracy requirements for such controls, for both military and civilian purposes, have become more and more stringent. It is comparatively easy to devise a remote control which will position the controlled element (assuming it to be rotary) within two or three degrees, but as the requirement for accuracy becomes more and more rigorous the difficulties of obtaining such control multiply and the penalties for failure of control increase. Similarly, monitoring becomes increasingly important with the requirement for increased accuracy, and in some systems there is danger that the monitoring signal may become confused with the control signal and itself assume control, thereby vitiating the entire system. Our invention is devised to overcome such difficulties.

In its broad aspects, our invention utilizes for control purposes a band of frequencies which normally lie within the range of a single voice frequency channel and which may be transmitted either by wire or by radio. The controlling mechanism comprises a generator of frequencies lying within such a band, and may, for example, be an oscillator or series of oscillators continuously tunable over such a band, or it may be arranged (and for some purposes this is preferable) to vary the frequencies in discrete steps corresponding to the desired controlled positions. The frequencies thus generated are transmitted to the controlled point. At this point there is located a fixed frequency oscillator which supplies a carrier current on which the transmitted frequency is modulated, and one of the resultant sidebands is filtered out of the modulation products and passed on to a "demodulator" circuit.

Connected to the controlled element is a "slave" oscillator substantially similar to the master oscillator which exercises control, and whose output frequency varies with the position of the controlled element in the same manner that the master oscillator frequency varies with the desired position of such element. This frequency is fed to the demodulator, and from the output circuit of the demodulator there is selected a frequency which is proportional to the difference between the master oscillator frequency and the slave oscillator frequency plus the frequency of the fixed frequency oscillator. This frequency, as last selected, is fed to a discriminator-detector, which generates a voltage proportional in magnitude and sign to the deviation of the actual position of the controlled element from its desired position. This voltage operates the servomotor to bring the controlled element to the position desired, at which point the discriminator voltage vanishes and the controlled element remains fixed until a new signal is supplied to it.

The procedure may be repeated if desired, in the reverse direction, transmitting the frequency which indicates the position of the controlled element back to the control point and there operating upon it in the same manner so as to indicate any lag in or failure of control. Furthermore, where the controlled element is a rotary one which it is desired to control continuously throughout over 360° of arc without discontinuities, it is possible to generate the positioning frequencies in two bands, each representative of something over 180° of rotation, and to so relate these bands and the potentials indicated by the error frequencies that continuous rotation can be obtained.

These features, together with various others inherent in our invention, will be more clearly understood from the ensuing detailed description of certain preferred embodiments of our device, taken in connection with the accompanying drawings, wherein:

Fig. 3 is a block diagram of a single band system provided with a telemetering circuit for indicating, at the control point, the position assumed by the servomechanism in response to the frequency transmitted from the control point;

Fig. 4 is a diagram, largely in block form, showing a simplified alarm circuit for indicating frequency deviations due to lapse of control at the control point; and Fig. 5 is a block diagram showing symbolically an electro-mechanical oscillator capable of generating the control frequencies in definite incremental steps.

Figure 1:
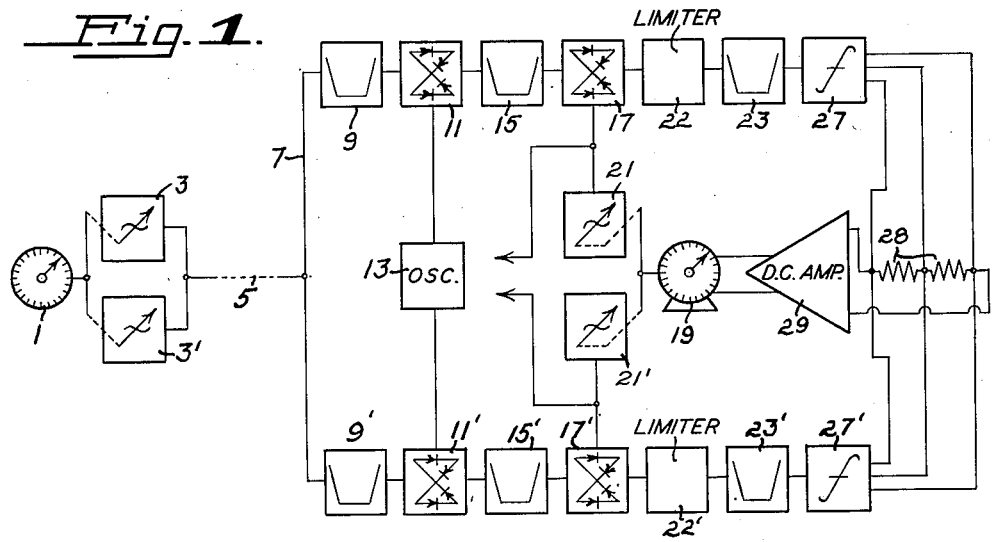
Fig. 1 is a block diagram of a dual-band system in accordance with our invention as applied to give continuous control to a rotating element over more than 360° of arc, i. e., so as to give continuous rotary control in either direction.

Referring to Fig. 1, a master dial 1 or equivalent control mechanism is mechanically geared to vary simultaneously the frequencies delivered by two master oscillators 3 and 3'. We prefer to operate both of these oscillators within the voice frequency band, but there is no necessity that they lie within this range, the preference being based upon the fact that such a band can be transmitted over an ordinary telephone circuit and that the frequency of such oscillators may be maintained constant to within a fraction of a cycle per second quite easily and without the use of complicated stabilizing means. The form taken by these oscillators is unimportant. They may be ordinary tunable electronic oscillators, say of the resistance-capacitance type, or they may be a series of vibrating reeds, tuning forks, or other mechanical oscillation generators of fixed frequency, one or the other of which are switched into the output circuits by commutators geared to the master control 1.

An oscillator of this latter type is shown symbolically in Fig. 5. A reed oscillator 2 of known type is used comprising a "comb" of reeds each tuned to a frequency differing from that of the adjacent reed or reeds by a fixed amount, each reed being magnetically coupled to a pick up coil. Connections to the individual coils are combined in a cable 4, which fans out to connect to the separate contacts of a commutating switch 6. The contact arm 8 of this switch is driven by the control mechanism to pick off the frequency corresponding to its position.

Figure 2:
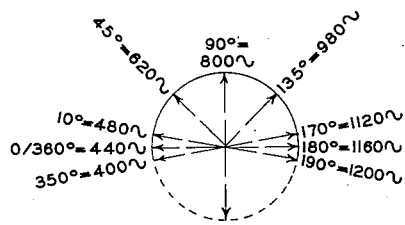
Fig. 2 is a chart showing control frequencies versus dial positions in the equipment and with the values selected for illustration in Fig. 1.
Figure 2:
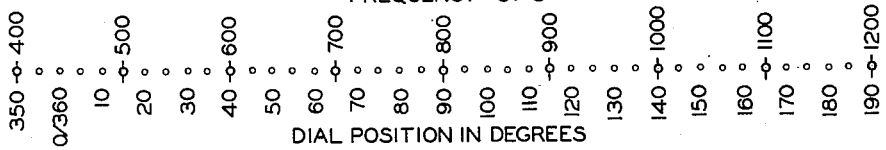
Figure 2:
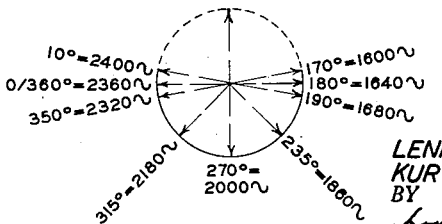

Whatever the form taken by the master oscillators, the frequencies delivered by each of them lie within separate bands. In the example chosen for illustration, the frequencies delivered by oscillator 3 lie within the band from 400 to 1200 cycles per second, while those delivered from oscillator 3' lie in the band from 1600 to 2400 cycles per second, the combined band totalling something less than one commercial telephone channel. Each position of the master control dial corresponds to a specific frequency or frequencies delivered by one or both of the oscillators. Fig. 2 illustrates a possible allocation of frequencies as against dial position; the 400 cycle minimum frequency developed by oscillator 3 corresponds to minus 10° (350 degrees) on the dial, the frequency increasing at the rate of four cycles per degree as the dial is advanced through 0° (360 degrees) clockwise through 180° to 190°, beyond which point oscillator 3 is cut out of the circuit. The small circles above and below the chart indicate the arrangement of the frequencies around the dial.

Oscillator 3' is out of operation during the greater part of the arc of operation of oscillator 3; it cuts in at 170° at a frequency of 1600 cycles, its frequency increasing at the same rate of 4 cycles per degree, through 180° and 360° to 2400 cycles at +10°, at which point it cuts out. It will thus be seen that through the two arcs, from 350° to 10°, and from 170° to 190°, both of the master oscillators are operative and changing in frequency at the same rate, but in different bands, as the control is advanced.

As indicated above, the nature of the transmission from the transmitter or control point to the site at which the control is to be effected is unimportant from the point of view of this invention. The control frequencies may be transmitted by a land line or telephone pair at their generated values, or they may be modulated on a carrier and transmitted either by land line or by radio. If transmitted directly, they are fed into a divided circuit 7 at the receiver point; if modulated on a carrier, the usual demodulating or detecting equipment (not shown) would have to be interposed.

The circuit 7 feeds two conjugate band-pass filters 9 and 9', each being designed to select from the mixed frequencies from the voice circuit those generated by one of the two master oscillators 3 and 3', with some tolerance to provide for normal deviations. Thus, band-pass filter 9 may be designed to pass the frequencies between 300 and 1300 cycles per second, while band-pass filter 9' passes frequencies from 1500 to 2500.

Considering the branch of the circuit including filter 9, the frequencies selected by it feed a modulator 11, which can be of any known type, such as a ring modulator, and are modulated upon a carrier frequency generated by a fixed frequency oscillator 13. The carrier frequency preferably is intermediate the frequencies of the two bands generated by the master oscillators 3 and 3', and it is, in the present case, assumed to be 1500 cycles per second.

As is well known, the modulation products delivered by modulator 11 include the frequencies F+A and F−A, where F is the frequency of oscillator 13 and A the frequency momentarily being supplied by master oscillator 3. These frequencies are fed into a second band-pass filter 15 designed to select one or the other of the sidebands developed by the modulator 11, the frequencies selected in this case being those lying in the upper sideband. In this case the sideband frequencies will vary between 1900 and 2700, and the filter may, accordingly, be designed to pass those between 1800 and 2800 to insure that the pass-band is flat within the range actually used.

The frequencies selected by the filter 15 feed into a "demodulator" 17, which may be a duplicate of the modulator 11, where they are modulated upon locally generated frequencies of values dependent upon the position of the elements to be controlled, or, what is the same thing, upon the position assumed by a servomotor 19, as will next be described.

The servomotor may or may not be fitted with a dial which duplicates that of the master control 1. In any case, however, it is mechanically coupled to oscillators 21 and 21' which are substantially duplicates of oscillators 3 and 3' and which operate over the same arcs of rotation to give the same frequencies in accordance with the position of the servomotor as do oscillators 3 and 3' with respect to the position of the master control dial. A frequency from oscillator 21 feeds modulator 17 with a frequency B depending upon the position of the servomotor, to produce the new frequencies $F+A+B$ and $F+A-B$.

Modulation products from demodulator 17 are preferably passed through a limiter 22 before being fed to a band-pass filter 23 which selects therefrom the lower sideband from this last modulation. From the filter the resultant frequencies are fed to a discriminator 27, the response curve of which is centered on the frequency of oscillator 13, and the resultant voltage is applied across the input resistor network 28 of a D. C. amplifier 29.

The discriminator 27 can be quite readily designed to deliver up to one volt per cycle deviation from its mid frequency, and in practice we prefer to use values ranging between .2 volt per cycle and one volt, depending upon the duty required of the apparatus. Thus, if the discriminator has been designed to deliver, say .5 volt per cycle deviation, it will develop four volts "positive" when fed by a standard amplitude signal from the differential transformer at a frequency of 1508 cycles, or at equal "negative" potentials if fed by a standard signal of 1492 cycles, the designations "positive" and "negative" being, of course, arbitrary. The discriminator output is fed to a D. C. amplifier 29, and thence to the coils of the reversible servomotor 19, causing it to rotate in one direction or the other in accordance with the sign of the potential developed by the discriminator 27.

The branch of the circuit 7 leading to band-pass filter 9' contains equipment similar to that in the branch already described except for the passbands of filters 9' and 15', the filter 9' passing the band from 1500 to 2500 cycles (the frequency range of master oscillator 3' with suitable tolerance) while the filter 15' passes the upper sideband frequencies developed by modulator 11' when fed by the output of oscillator 13 and the frequencies passed by filter 9', i. e., from 3000 to 4000 cycles. The band-pass filter 23' passes the same band as filter 23, namely, the difference frequencies developed by the demodulator 17' when fed by the output of slave oscillator 21'. The output of filter 23' feeds on to discriminator 27' in the same manner as the frequencies from the other branch of the circuit, the latter discriminator also feeding resistor network 28 and amplifier 29.

The operation of the system can best be appreciated by taking an example. Assume that the servomotor is at the position 0° and that it is desired to move it to the position 10°. The master control dial 1 is moved to the 10° position, causing master oscillator 3 to deliver a frequency of 480 cycles. This frequency passes filter 9 but not filter 9' and is modulated on the 1500 cycle frequency from oscillator 13 to produce an upper sideband frequency of 1980 cycles which is passed by filter 15 to demodulator 17. The servomotor 19, being in the 0° position, controls oscillator 21 to produce 440 cycles. Combined in the modulator 17 with the 1980 cycle frequency passed by filter 15, this develops a lower sideband frequency of 1540 cycles which, fed to the discriminator 27, produces an output voltage therefrom of $+20$ volts. Amplified by the D. C. amplifier 29, this causes a clockwise rotation of the servomotor, which acts to raise the frequency developed by oscillator 21 until it, too, reaches the value of 480 cycles. When this occurs the lower sideband frequency from demodulator 17 is 1980 cycles minus 480, or 1500 cycles, and this being the mid-point of discriminator 27 its output voltage falls to zero, thus removing all driving potential from the servomotor 19, causing it to come to a stop. Should the servomotor over-run, causing an increase in the frequency delivered by oscillator 21, say, to 482 volts, the lower sideband frequency would drop below 1500 to 1498 volts, and the discriminator 27 would then produce a one-volt negative potential, tending to reverse the motor. In practice, of course, suitable damping means are provided on the servomotor to prevent such over-running under normal operating conditions.

In the example chosen both the starting and stopping positions are within the range where the oscillator 3' is effective as well as the oscillator 3. At the 0° position oscillator 3' is generating 2360 cycles per second, which is passed by filter 9' to produce in modulator 11' the sum frequency of 3860 cycles. This frequency, combined in demodulator 17' with a 3900 cycle frequency from oscillator 21' produces a difference frequency of 1540 cycles, which is the same as that developed in the circuit previously described. Discriminator 27' therefore operates upon it in the same manner, and the effect of both of the control oscillators is added to produce the desired result. In the portions of the arc of control where the two oscillators 3 and 3' are both operative, they therefore produce the same final frequency and their control effect upon the servomotor is additive, while in the portions of the arc where only one of the oscillators is operating, its output alone is sufficient to effect the desired control.

It will be noted that the same result can be achieved with the same choice and distribution of frequencies by selecting the lower sideband from the modulation products of modulator 11 and the upper sideband from the modulation products of demodulator 17. In either case the frequencies fed to the discriminators are $F\pm(A-B)$, and the only difference is a difference in the sign of the D. C. output from the discriminator, requiring a reversal in the connections to the servomotor 19.

With the frequencies here chosen for illustration the choice of the upper sideband from the output of modulators 11 and 11' is preferable, since in this case the minimum frequency handled by the system is the 400 cycle frequency from master oscillator 3, which is well within the frequencies which can be satisfactorily handled by standard telephone equipment. If the difference frequency from the first modulation were chosen, the minimum frequency handled would be the difference frequency 1600 minus 1500, or 100 cycles in the output of modulator 11', which is a little lower than the lower limit of a voice channel as considered in standard communication practice. It is quite possible to use frequencies this low, and, moreover, the fact that it would be developed at all is due to the choice of frequencies which happens to have been made for the various oscillators in the system. It should be perfectly apparent that there is nothing unique about the bands chosen, and that corresponding sets of frequencies can be selected in almost any band wherein it is desired to operate, the band illustrated here being merely one that happens to fit in well with standard telephone equipment and components.

The use of a double channel system such as has been described is only indicated under circumstances where the range of control is over 360° and should be continuous, the controlled element reaching its new position in minimum time. If the maximum range of control desired is 360° or less and no disadvantage is involved in having the servo traverse the entire arc from, say, 359° back to 1°, a single frequency band can be distributed around any portion of the arc which it is desired to cover. Further, if the type of control which is to be exercised is, say, linear instead of rotary, the conversion of rotary to linear motion is a simple mechanical expedient which is well understood, and need not be described here. In the problems to be met in devices of the type here considered, linear controls are almost universally within fixed limits, and it is only in the case of rotary elements that continuous controls, involving unidirectional rotation of unlimited extent, such as can be accomplished with the equipment thus far described, are necessary.

Where a control of the discontinuous type is satisfactory, the branch of the circuit of Fig. 1 containing the equipment designated by the accented reference characters can be omitted, as can the band-pass filter 9. Band-pass filters 15 and 23, however, will both be required in almost every case, since, as has been shown, the frequencies from the upper sideband of modulator 11 with the lower sideband of modulator 17, and the lower sideband of modulator 11 with the upper sideband of modulator 17, give oppositely directed potentials which would result in inoperativeness of the device. In some rare instances it might be possible to eliminate filter 23 if the frequencies from oscillator 13 and the master oscillators were widely enough separated so that the two sum frequencies or difference frequencies fell outside of the range of the discriminator 27, but this circumstance would be unusual.

In many cases where remote controls are employed it is desirable to have monitoring or telemetering equipment which will repeat back to the point from which control is exercised the response of the controlled equipment. With our invention this can be done with very slight additions to the equipment at the controlled point, all that is necessary being an additional circuit or circuits, 31, 31' connected to the output of the oscillators 21, 21'.

A schematic layout of such a control system as applied to one branch of the circuit shown in Fig. 1 is illustrated in Fig. 3. The master control 1 and master oscillator 3 are as before, and feed a voice frequency circuit (or a circuit on which the voice frequencies are transmitted by carrier) to receiving equipment 33, assumed to comprise the elements of Fig. 1 designated by reference characters from 9 to 29 inclusive, with the exception of the servomotor 19 and the slave oscillator 21, which are separately shown.

The branch line 31 from the slave oscillator connects to a second voice frequency channel 35 which feeds receiving equipmnet 33', preferably in all respects a duplicate of the equipment 33. In this case the slave oscillator 21 acts as a master oscillator with respect to the repeater servo 19'' and its slave oscillator 21''. The repeater motor 19'' may be identical with the servomotor 19 in case the power required from the latter is small; in other cases the repeater motor 19' may be a very small affair, since the only duty imposed upon it is to adjust the frequency of slave oscillator 21' and indicate its position upon the dial.

Any deviation between the readings of the master control dial 1 and the indicator dial of servomotor 19'' will show either a lag in the control system or a lapse of control. It will be realized that if servomotor 19 is operating heavy equipment, as it may have to do, it may require an appreciable time to follow the movements of the master control dial. The motor 19'', however, can be very small and light, with a minimum of inertia, so that its lag with respect to servo 19 is small.

If the deviation as between the readings of control dial 1 and the indicating dial of the repeater motor is merely due to lag, the two will eventually indicate the same thing, and the lag of the system as a whole can be evaluated. If there is a continuing discrepancy between the two readings, the trouble can be localized by operating switches 37 and 39 to connect the output of the master oscillator 3 directly to the input of receiving equipment 23', at the same time disconnecting oscillator 21 from that input. If, under these conditions, the two dials read the same, the trouble must be sought at the remote point and corrected, but if the difference in reading persists the difficulty is at the master control location, and either a correction factor should be applied or the necessary adjustments made wherever the trouble is localized.

In cases where the complexity of a repeater is not warranted, the channel 35 carrying the frequency of the slave oscillator 21 can be fed into any type of frequency comparator circuit also fed by master oscillator 3 to give a signal which is merely indicative of a frequency deviation as between the two oscillators. One such circuit is shown in Fig. 4, and comprises a hybrid coil 41, the balanced input circuits of which carry the two frequencies to be compared, while the third winding, which is center tapped, feeds a center-tapped polar relay 43 through a pair of rectifiers 45. If the two frequencies are the same, contact-bearing armature 47 of the polar relay will remain fixed in one position. If, however, there is a difference between the two frequencies, the armature can be adjusted to vibrate at the difference frequency.

One contact of the polar relay connects to ground through a battery or other current source 49. The armature 47 connects to one terminal of a condenser 51, the other terminal of which connects to ground through a charging resistor 53. The second contact of the polar relay connects to a larger condenser 55 which is also connected to ground through a resistor 57, and is shunted by an adjustable resistor 59. When the polar relay armature connects with the lower contact and the battery 49, condenser 51 charges at a rate which can be regulated by selection of the value of resistor 53. When the armature connects with the upper contact, condenser 51 partially discharges into condenser 55, the rate of discharge being separately controllable by choice of the size of the condenser 55 with relation to that of condenser 51 and the value of resistor 57. The charge thus imposed upon condenser 55 at once begins to leak off through resistor 59, but if the armature 47 vibrates with sufficient rapidity the charges on condenser 55 will build up step by step with each cycle of oscillation of the armature.

The connection from the upper contact of the relay to condenser 55 also connects to the control electrode of a gaseous conduction tube 61, and when the charge on condenser 55 reaches a sufficiently high positive value, discharge will take place through the tube and actuate a relay 63 which in turn can operate any desired type of alarm circuit, here indicated as a bell, which will continue to ring until the main circuit through the tube 61 is broken by opening an alarm reset key 65. The comparator circuit can be adjusted by resistor 59 and by proper selection of the various condenser and resistor values over a rather wide range and with a considerable degree of accuracy. It is quite easy to make it actuate the alarm with a difference frequency of two cycles per second (corresponding in this case to one-half degree of arc) and not respond to lesser frequency deviations.

It should be quite evident that through the use of stepdown ratios and "vernier" controls of various types accuracy of control to within much less than one degree can be obtained. A simple dial control will readily give results of this accuracy, but by band spreading methods which are thoroughly understood in the art and by using wider frequency bands of sharper differentiating circuits, or both, much greater accuracy can be achieved.

We claim:

1. The method of remotely controlling the position of a mechanical element which comprises the steps of generating an electrical oscillation of a frequency A varying as the desired position of said element, transmitting said frequency to the location of said element, generating a second oscillation of fixed frequency F, modulating said frequency F with said frequency A to produce a sideband frequency F±A, generating a third oscillation of frequency B varying as the actual position of said element, modulating said sideband frequency F±A with said frequency B to produce a sideband frequency F±(A—B), discriminating said frequency $$F\pm(A-B)$$

against said frequency F to produce a direct current varying in accordance with ±(A—B) as to magnitude and polarity, and utilizing said direct current to move said element into the desired position.

2. The method as set forth in claim 1 which includes the steps of transmitting one of the frequencies from said location back to the controlling point and there comparing said frequency with the presumably equal frequency there generated to monitor the accuracy of control.

3. The method as set forth in claim 1 which includes the steps of transmitting one of the frequencies from said location back to the controlling point, there discriminating said last-mentioned frequency again to produce a direct current varying as a function of frequency B and utilizing said last-mentioned direct current to indicate any lapse of control.

4. The method in accordance with claim 1 of positioning a rotatable element throughout a complete circle which includes the steps of generating oscillations of two frequencies A and A', each of which is in a separate band, the frequencies in each band corresponding to desired positions of said element within an arc of more than 180° and less than 360°, said arcs overlapping at each end to cover jointly the entire circle, and generating like frequencies B and B' corresponding to actual positions of said element within corresponding arcs.

5. The method in accordance with claim 1 of positioning a rotatable element throughout a complete circle which includes the steps of generating oscillations of two frequencies A and A', each of which is in a separate band, the frequencies in each band corresponding to desired positions of said element within an arc of more than 180° and less than 360°, said arcs overlapping at each end to cover jointly the entire circle, generating like frequencies B and B' corresponding to actual positions of said element within corresponding arcs, using the same fixed frequency F to produce and discriminate the side bands as set forth in claim 1, and adding the D. C. components produced by discriminating to accomplish the desired control within the ranges where said arcs overlap.

6. A remote control system comprising a controlling element and a controlled element, a pair of generators of electrical oscillations of a plurality of frequencies within a predetermined band, means actuated by said controlling element for selecting from one of said pair of generators a frequency A within said band corresponding to a desired position of said controlled element, means for transmitting said frequency to the location of the element to be controlled, a generator of electrical oscillations of fixed frequency F, a modulator connected to said fixed frequency generator and said selecting means to produce a sideband frequency F±A, means actuated by said controlled element for selecting from the second of said pair of generators a frequency B within said band corresponding in like manner with frequency A to the actual position of said controlled element, a second modulator connected to modulate said frequency B on said sideband frequency F±A to produce a new sideband frequency F±(A—B), a discriminator circuit connected to said modulator having a midpoint at frequency F and including a pair of opposed rectifiers to produce a differential direct current proportional to ±(A—B), a reversible motor connected to drive said controlled element, and connections from said discriminator circuit to said motor to actuate the same in a direction dependent on the sign of the quantity ±(A—B).

7. Apparatus in accordance with claim 6 including means for transmitting said frequency B back to the site of said controlling element, and means at said site for comparing said frequency B with said frequency A to monitor the accuracy of control.

8. The method as set forth in claim 1 which includes the steps of transmitting frequency B back to the controlling point and there operating on said frequency in the same manner as on frequency A to telemeter the operation of the control.

9. Remote control apparaus comprising a generator of electrical oscillations of a plurality of frequencies differing by fixed steps, a control switch connected to select any desired one of said frequencies, a control link for transmitting the selected frequency A to the location of an element to be controlled, a second generator of electrical oscillations of a plurality of frequencies substantially identical with said first-mentioned frequencies, a switch actuated by said element for selecting successively in accordance with the position of said element from said last-mentioned oscillations one of frequency B corresponding to the actual position of said element, a fixed frequency oscillator of frequency F, a modulator connected to said fixed frequency oscillator and said control channel to produce a sideband frequency $F \pm A$, a second modulator connected to said first modulator and said second-mentioned switch to produce a frequency $F \pm (A-B)$, a discriminator circuit having a midpoint at frequency F and including a pair of opposed rectifiers to produce a differential D. C. proportional in sign and magnitude to the quantity $\pm (A-B)$, a reversible motor connected to drive said element and said second-mentioned selector switch, and connections from said rectifiers to said motor to drive the same in a direction determined by the polarity of the current therefrom.

10. Means for positioning a controlled mechanical element in accordance with the position of a controlling mechanical element at a distance therefrom comprising means for generating a variable frequency electric wave within a selected band and means for varying said frequency incrementally in accordance with incremental changes in position of said controlling element, a generator of substantially constant frequency waves, means for combining said variable and constant frequency waves to produce a side-band frequency, means for generating a second variable frequency wave within said band and means for varying the frequency generated thereby incrementally in accordance with incremental variations in position of said controlled element, means for combining said second variable frequency wave with said side-band frequency wave to produce a wave the frequency whereof approximates said constant frequency, means for deriving an electrical potential dependent in magnitude and sign on the deviation of said last mentioned wave from said constant frequency and the direction of such deviation, and means responsive to said electrical potential for moving said controlled element in a direction to reduce said frequency deviation.

LENNART G. ERICKSON.
KURT E. APPERT.

REFERENCES CITED

The following references are of record in the file of this patent:

UNITED STATES PATENTS

| Number | Name | Date |
|---|---|---|
| 2,395,708 | Alexanderson et al. | Feb. 26, 1946 |
| 2,404,101 | Schock | July 16, 1946 |
| 2,408,819 | Sorensen | Oct. 8, 1946 |

FOREIGN PATENTS

| Number | Country | Date |
|---|---|---|
| 101,892 | Sweden | June 23, 1941 |